United States Patent [19]

Hillen

[11] Patent Number: 4,943,199
[45] Date of Patent: Jul. 24, 1990

[54] MACHINE TOOL STORAGE APPARATUS

[75] Inventor: Gerhard Hillen, Rorschacherberg, Switzerland

[73] Assignee: Starrfrasmaschinen AG, Rorschacherberg, Switzerland

[21] Appl. No.: 318,722

[22] Filed: Mar. 3, 1989

Related U.S. Application Data

[63] Continuation of Ser. No. 24,302, Mar. 10, 1987, abandoned.

[51] Int. Cl.⁵ .................................................. B65G 1/10
[52] U.S. Cl. ........................................ 414/331; 312/3; 414/280; 414/749; 414/799; 414/222; 414/292; 414/661; 29/568; 221/87
[58] Field of Search ............... 414/266, 267, 277, 279, 414/292, 280, 281, 282, 268, 285, 286, 331, 799, 749, 753, 661, 222; 221/87; 312/220, 221, 3 R; 29/568

[56] References Cited

U.S. PATENT DOCUMENTS

| | | | |
|---|---|---|---|
| 2,624,470 | 1/1953 | Geist | 414/277 X |
| 4,451,111 | 5/1984 | Monroe | 312/3 X |
| 4,546,901 | 10/1985 | Buttarazzi | 414/280 X |
| 4,563,120 | 1/1986 | Josserand | 414/280 X |
| 4,668,150 | 5/1987 | Blumberg | 414/280 X |

FOREIGN PATENT DOCUMENTS

| | | | |
|---|---|---|---|
| 596279 | 7/1959 | Italy | 414/279 |
| 124625 | 7/1984 | Japan . | |
| 223607 | 12/1984 | Japan | 414/280 |
| 242105 | 12/1985 | Japan | 414/331 |

Primary Examiner—Frank E. Werner
Attorney, Agent, or Firm—Helfgott & Karas

[57] ABSTRACT

Machine tool apparatus utilizes a tool magazine provided with first plurality of horizontally extending parallel separate compartments disposed vertically one above the other. A plurality of elongated tool units are disposed in the compartments, each compartment containing a like number of units, the units in each compartment being disposed in spaced side by side position across the width of the compartment. Each unit in any compartment is vertically aligned with the correspondingly positioned units in all other compartments. Displaceable, first mechanisms coupled to each unit enable each unit to be separately moveable back and forth along the length of its compartment to either extend the unit out of its compartment into position for subsequent transfer or to retract the corresponding unit back into its compartment. Second mechanisms coupled to the first mechanisms select any one unit and by moving the first mechanism coupled to the selected unit cause the selected unit either to be extended or to be retracted.

5 Claims, 3 Drawing Sheets

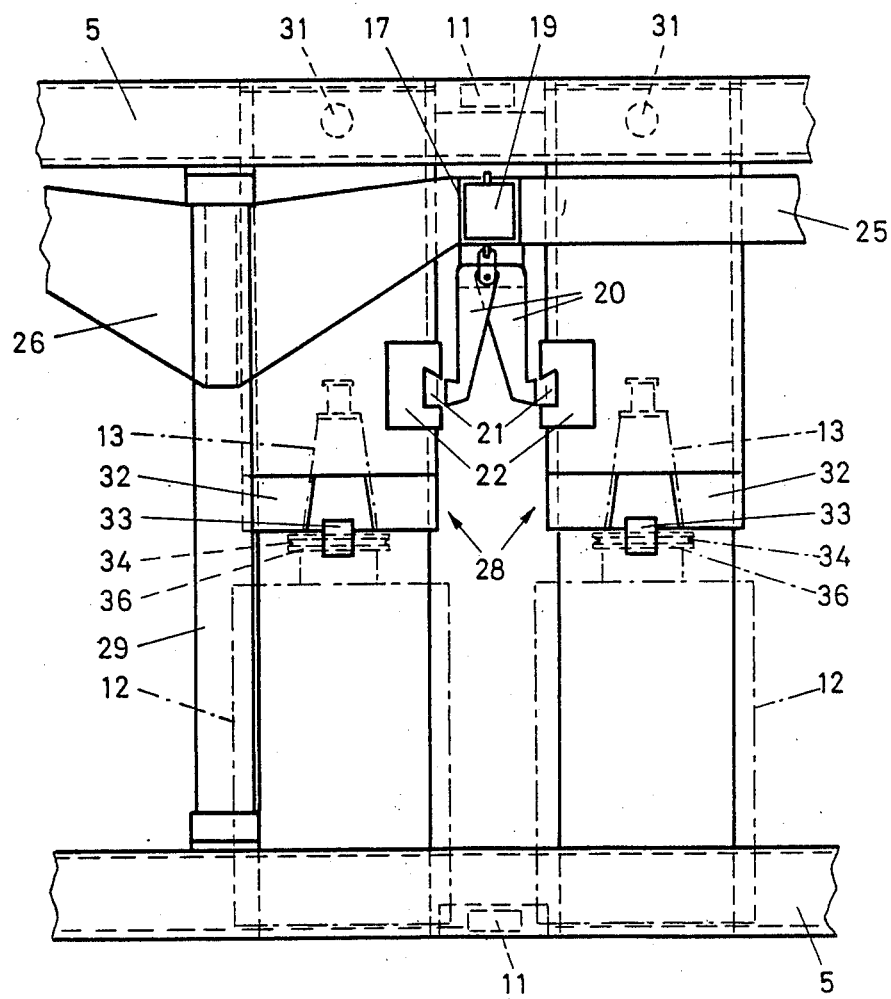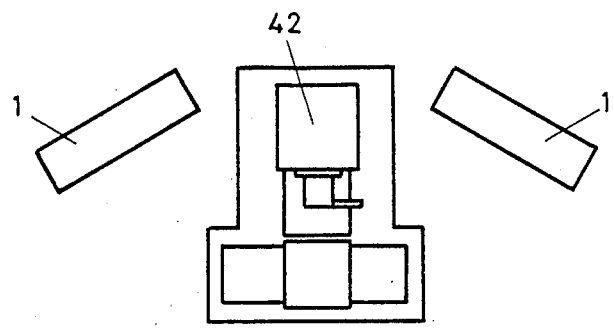

MACHINE TOOL STORAGE APPARATUS

This is a continuation of application Ser. No. 024,302, filed Mar. 10, 1987, and now abandoned.

BACKGROUND OF THE INVENTION

The invention relates to a machine tool storage apparatus for storing several tool units comprising a tool and a tool holder positioned in a tool magazine.

It is necessary for automating the machining of workpieces that an automatic tool change is available in the case if a plurality of machine tools are required, apart from satisfying other conditions. Therefore each machine tool has its own tool magazine for storing and making the tools ready. By means of a handling or manipulating device operated by a control system, the tool units are removed from the tool magazine and transferred to the machine tool. Simultaneously the tools no longer required are removed from the machine tool and returned to the tool magazine.

Numerous different constructions of an apparatus of this type are known. In the simplest construction, the tool magazine comprises a rack, in which the tool units are stored in a given sequence. In another known apparatus, the tool magazine comprises a disk-shaped plate, on whose circumference are placed the individual tools or tool units. However, this has the disadvantages that a large space is required for storing relatively few tools. Both of the two aforementioned apparatuses suffer from the disadvantage that the stored tools are exposed to dirt. This disadvantage is also encountered with so-called flat stores or ranks, in which the tools or tool units are arranged on a planar, generally vertical surface and are removed and returned by the handling device which is generally a gantry loader. This leads to a high tool storage capacity and in addition each tool can be rapidly reached by means of the handling device, without any need to move all the tools. However, the large space requirement is disadvantageous because, apart from its own space requirement, each tool requires additional surface areas for access purposes and these areas cannot otherwise be used, so that the handling device is involved in long travel paths.

SUMMARY OF THE INVENTION

It is an object of the present invention to construct a storage means of the aforementioned type so that tools or tool units can be stored in a space-saving and protected manner, the tools in the tool magazine being checkable and interchangeable without impairing the operation of the machine tool.

According to the invention this problem is attained in that in the tool magazine the tool units are placed on extracting devices displaceable at right angles to the longitudinal extension of the tool magazine and secured by retaining means.

A controlled displacement device chooses a predetermined tool unit that can be moved out of the tool magazine on the extracting device and is consequently ready for feeding to the machine tool.

More particularly, machine tool apparatus in accordance with the invention which comprises a tool magazine provided with a plurality of horizontally extending parallel separate compartments disposed vertically one above the other. A plurality of elongated tool units are disposed in the compartments. Each compartment contains a like number of units, the units in each compartment being disposed in spaced side by side position across the width of the compartment. Each unit in any compartment is vertically aligned with the correspondingly positioned units in all other compartments.

Displaceable extracting means coupled to each unit enable each unit to be separately moveable back and forth along the length of its compartment to either extend the unit out of its compartment into position for subsequent transfer or to retract the corresponding unit back into its compartment.

Displacement coupled to the extracting means select any one unit and by moving the first means coupled to the selected unit to cause the selected unit either to be extended or to be retraced.

The displacement means can include a plurality of horizontally spaced vertically extending arm means, each arm means being associated with a corresponding group of adjacent vertically and horizontally spaced units in all compartments. Each arm means is adapted to be detachably connected to any selected unit in the corresponding group and being moveable back and forth along the length of the compartments.

The displacement means can include a pneumatic cylinder operating connected to all armed means for moving all arms means back and forth simultaneously.

The aforementioned objected and advantages of the invention as well as other objects and advantages thereof will either be explained or will become apparent to those skilled in the art when this specification is read in conjunction with the accompanying drawings and specific description of preferred embodiments which follow.

BRIEF DESCRIPTION OF THE DRAWINGS

The invention is described in greater detail hereinafter relative to non-limitative embodiments and the attached drawings, which show:

FIG. 3 is a diagrammatically represented plan view of the tool magazine along line III—III in FIG. 2.

FIG. 4 is a diagrammatic representation of the arrangement of a machine tool with two storage means.

DETAILED DESCRIPTION OF PREFERRED EMBODIMENTS

Figure 1:
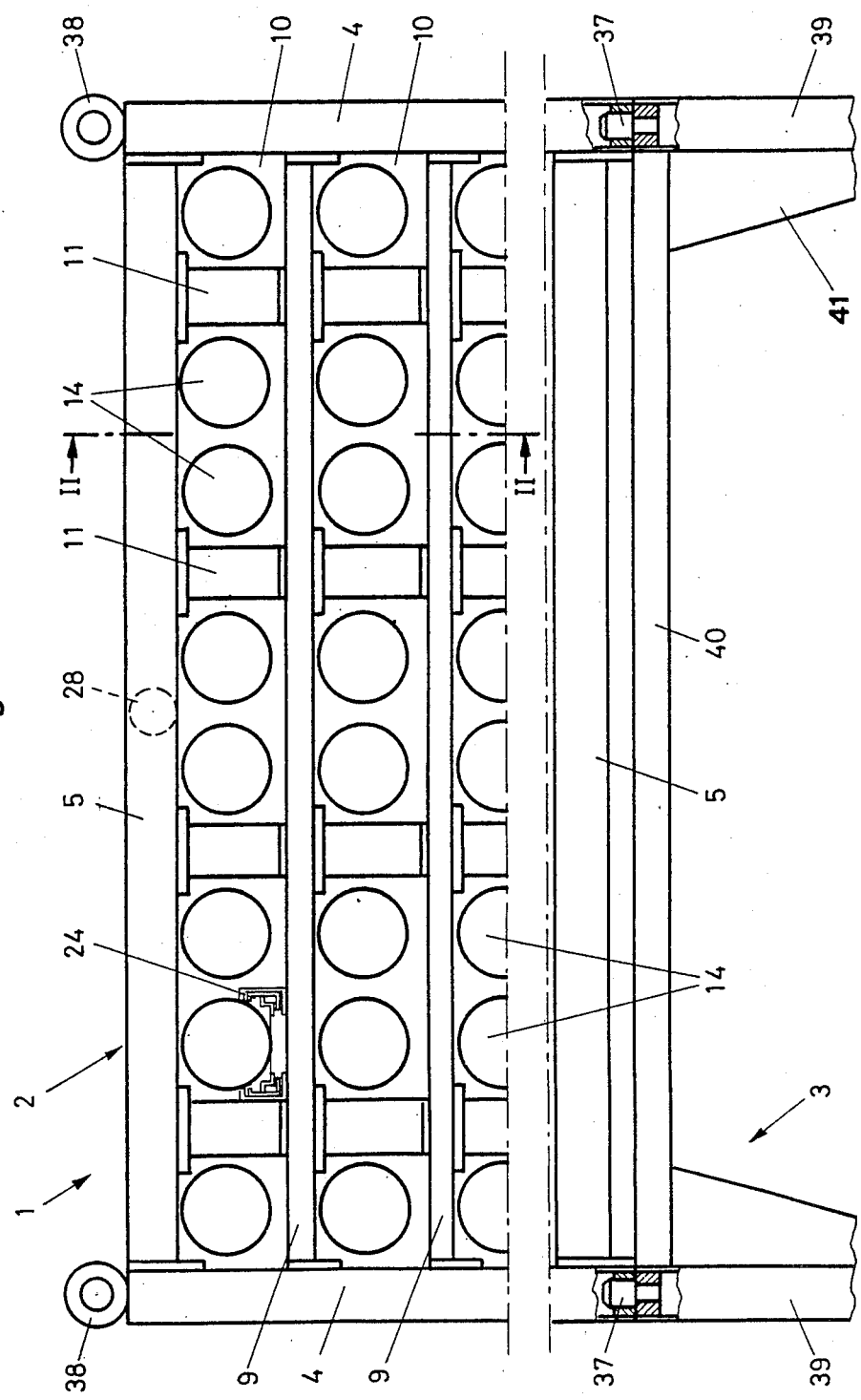
FIG. 1 is a front view of a storage means for a machine tool with a tool magazine.

The storage means 1 shown in FIG. 1 has a tool magazine 2, which is supported on an underframe 3. The tool magazine 2 is a framework or latticework structure formed from struts 4 and cross-beams 5, in which the top, bottom and sides are constructed as closed walls. The front 6 and and back 7 of tool magazine 2 (FIG. 2) are closed by movable flaps 8, but can be opened if required. On the front and back of tool magazine 2 are installed several crosspieces 9, which subdivide the inner area into compartments 10. In addition, the crosspieces 9 are reciprocally braced by several supports 11.

Each compartment 10 contains a row of a plurality of tool units 14 extending across the width of the compartment and each constituted by a tool 12 and a tool holder 13. The longitudinal axis of such unit is at right angles to the row. FIG. 1 only diagrammatically shows the tool units 14, while the structure thereof can be gathered from FIGS. 2 and 3. Tool 12 is e.g. a cylindrical milling cutter and the tool holder 13 is provided with a cone or taper shank, which can be fixed in the machine tool spindle.

FIG. 1 shows three horizontal compartments 10, disposed vertically, one above the other, but the tool magazine 2 can have a random number of compartments 10, e.g. eight compartment, so that on a basis of eight tool units 14 per compartment, there is space for storing and providing 64 tool units 14. Obviously there can be a number differing from eight of tool units 14 in each compartment. In all cases, each compartment contains supports 11 in a number corresponding to half the tool units 14 in the manner shown in FIG. 1, i.e. a support 11 is provided between each two tool units 14, with the exception of the ends of the compartment 10, where only a single tool unit 14 is housed between the outermost support 11 and the sides.

Vertical arms 17 are displaceably arranged in the free space 16 formed between supports 11. Arms 17 are e.g. constructed as a U-shaped profile (FIG. 3), in which in each compartment 10 are fixed two lifting units 19, e.g. electrically operated lifting magnets. The two lifting units 19 are used for the coupling and uncoupling of arm 17 with respect to the two adjacent tool units 14. Lifting units 19 operate pivotable coupling hooks 20 which, for coupling tool unit 14 are locked in a slot 21 of a coupling catch 22 arranged on an extracting device and on which is arranged in each case one tool unit 14 and which can be moved in front of the front 6 of tool magazine 2 and back again.

Arms 17 are fixed to a cross-member 25 extending over the length of the tool magazine 2 and, in all, there are half as many arms 17 as there tool units 14 in a compartment 10 (FIG. 3). Cross-member 25 is centrally provided with a plate-like widened portion 26, by means of which cross-member 25 with arm 17 is fixed to a displacement device 28. The latter is e.g. a positionable pneumatic drive, e.g. supplied by Martonair (FIGS. 2 and 3), which comprises a cylinder 29 and a holder 30 arranged on the outside of cylinder 29 and connected to the piston located in the latter. Cross-member 25 with its plate-like widened portion 26 is firmly connected to holder 30. FIG. 3 only shows two superimposed compartments 10. Obviously arms 17 have a length such that they can move the extracting devices 24 into all the compartments 10.

Figure 2:
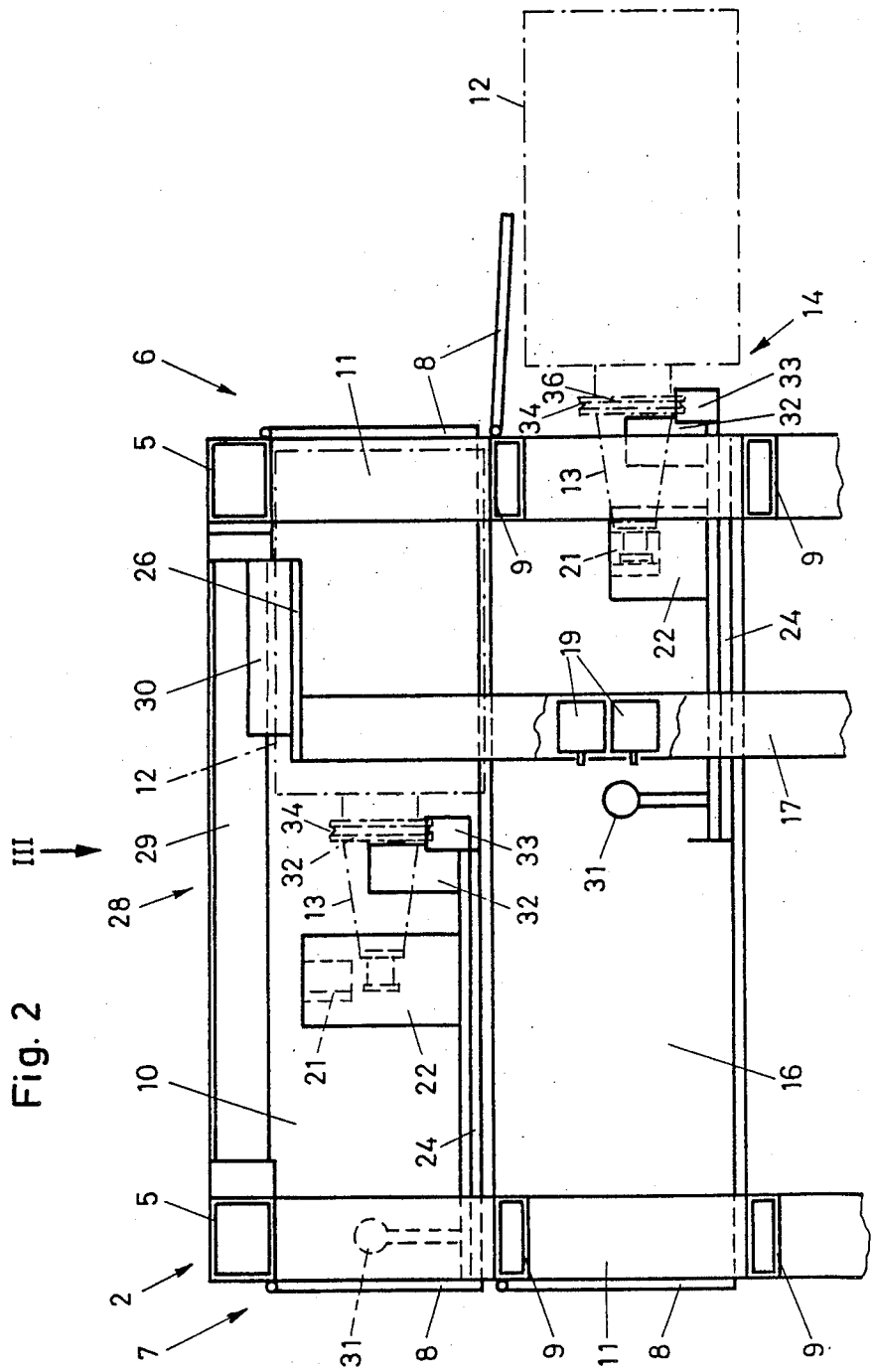
FIG. 2 is a diagrammatically represented crosssection of the tool magazine along line II—II of FIG. 1 on a larger scale.

FIGS. 1 and 2 show the extracting devices 24, which are e.g. of the type generally known in connection with extractable drawings of filing and tool cabinets (e.g. Rollon double stroke extracting devices) and are consequently not shown in detail. Such extracting devices 24 permit the movement of tool unit 14 in front of the front 6 of tool magazine 2 into the transfer position by means of displacement device 28 or in front of the back 7 of tool magazine 2 in manual manner by means of a handle 31 fixed to extracting device 24 for checking and replacing tool unit 14. These operations can be carried out without interrupting the operation of the machine tool.

Tool unit 14 is held by means of a retaining ring 32 on extracting device 24, in which at the top a ring segment is removed for forming a slot and which is provided on the inside with an internal cone corresponding to the cone of tool holder 13. This ensures a reliable, exact positioning of tool unit 14. In addition, tool unit 14 is secured by an elastic cam 33 fixed to retaining ring 32 and which projects into a driving groove 34 of a gripping ring 36, by means of which the handling device of the machine tool grips tool unit 14. Due to the fact that retaining ring 32 has a slot at the top, tool unit 14 can be raised from retaining ring 32, even in the case of a limited longitudinal displacement. The resistance exerted by elastic cam 33 must be overcome by the handling device.

The tool magazine 2 is positioned on underframe 3 by positioning cams 37. Tool magazine 2 can be suspended on rings 38 located on the top surface and then transported. This makes it possible to use different tool magazines with different tool sets on the machine tool.

In much the same way as the tool magazine 2, underframe 3 comprises struts 39 and cross arms 40, reinforcing webs 41 also being provided. Obviously the tool magazine 2 and underframe 3 can be constructed in a random manner. The parts can be welded together, screwed together or assembled from prefabricated parts. It is merely necessary to provide corresponding space for housing the displacing device 28 and the arms 17 with crosspiece 25.

In FIGS. 2 and 3 displacement device 28 is fitted to the top surface of tool magazine 2. However, it is also possible to position the displacement device at the bottom and then arms 17 are vertically upwardly directed.

FIG. 4 diagrammatically shows a machine tool 42, with which are associated two of the above-describes storage means 1. This makes it possible to make available sufficient tools or tool units 14 for machining large programs. The tool magazine 2 is also characterized in that it requires little space, because the tools or tool units are extended for transferring to the handling device and consequently no additional space is required, tools are interchangeable and checkable without impairing operation, the tool units remain in the closed interior of the tool magazine, is only opened for extending the same and it is interchangeable.

The described tool magazine is operated by means of an electronic control system having a processor permitting the automatic control of all the coupling movements of the tool magazines and the displacement thereof through the displacing device.

While the fundamental novel features of the invention have been shown and described and pointed out, it will be understood that various substitutions and changes in the forms of the details of the embodiments shown may be made by those skilled in the art without departing from the concepts of the invention as limited only by the scope of claims which follows.

What is claimed is:

1. Machine tool storage apparatus comprising:
   a modular tool magazine provided with a plurality of horizontally extending parallel separate compartments disposed vertically one above the other, said tool magazine being liftable and stackable on a like tool magazine;
   a plurality of elongated tool units disposed in said compartments, each compartment containing a like number of said units, the units in each compartment being disposed in spaced side by side positions across the width of the compartment, each unit in any compartment being vertically aligned with the correspondingly positioned units in said vertically disposed compartments;
   horizontally displaceable extracting means supporting each unit for enabling each unit to be rectilinearly separately moveable back and forth along the length of its compartment to either extend the unit out of its compartment into a position for subsequent transfer or to retract the corresponding unit back into its compartment, said extracting means including a like plurality of extracting devices, each extracting device being coupled to a corresponding unit via a corresponding retaining and positioning ring;

displacement means for selecting any one unit and moving said displaceable extracting means coupled to the selected unit to cause the selected unit either to be extended or to be retracted, said displacement means including a displacing mechanism coupled to said extracting means;

said displacement means including a plurality of horizontally spaced vertically extending arm means, each arm means being associated with a corresponding group of adjacent vertically and horizontally spaced tool units in all compartments, each arm means being adapted to be detachably connected to any selected unit in the corresponding group and being rectilinearly moveable back and forth along the length of the compartments;

the displacement means further including a pneumatic cylinder and means for connecting said cylinder to all arm means for moving all arm means back and forth simultaneously;

said connecting means including a crosspiece connected to all of said arm means;

each arm means being provided with a plurality of detachable coupling devices, each coupling device being associated with a corresponding one of the tool units in the corresponding group;

each extracting device supporting thereon a coupling catch having a slot;

each coupling device including a drive means connectable to a pivotable coupling hook which can be locked in the slot of said coupling catch of a corresponding extracting device.

2. The apparatus of claim 1, wherein each unit has an associated mounting support including said retaining ring for coupling the unit with the respective extracting device.

3. The apparatus of claim 2, wherein the mounting support further includes an elastic cam fixed to said retaining ring which is slotted.

4. The apparatus of claim 2, wherein the tool magazine is supported on an underframe.

5. The apparatus of claim 1, wherein the tool magazine has closed top, bottom and side walls and is closed in a front and a back thereof by dust-tight flaps associated with the tool units, the front of said magazine being opened for extending and retracting said units and the back being opened for checking and replacement of said units.

* * * * *